(12) United States Patent
Nagata et al.

(10) Patent No.: US 6,565,444 B2
(45) Date of Patent: May 20, 2003

(54) ELECTRONIC EQUIPMENT AND TELEVISION GAME MACHINE HAVING HEAT RADIATION STRUCTURE

(75) Inventors: Hideo Nagata, Kyoto (JP); Junji Takamoto, Kyoto (JP); Yuji Hori, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/769,724

(22) Filed: Jan. 26, 2001

(65) Prior Publication Data

US 2001/0027132 A1 Oct. 4, 2001

(30) Foreign Application Priority Data

Jan. 28, 2000 (JP) ........................................ 2000-020261

(51) Int. Cl.7 ............................. G06F 19/00; H05K 7/20
(52) U.S. Cl. .......................................... 463/46; 361/695
(58) Field of Search .................................. 463/1, 30–31, 463/34, 40–47; 361/687–697, 701–704, 709–714, 717–722; 165/80.2, 80.3, 104.33, 104.34, 122, 126, 164, 171–178, 185; 174/15.1–15.2, 16.1, 16.3; 257/701, 706–707, 711–713, 717, 720, 722; 454/184, 253, 354; 415/211.1, 213.1, 175–178

(56) References Cited

U.S. PATENT DOCUMENTS

| | | | |
|---|---|---|---|
| 5,136,464 A | | 8/1992 | Ohmori |
| 5,195,576 A | | 3/1993 | Hatada et al. |
| 5,287,244 A | | 2/1994 | Hileman et al. |
| 5,422,787 A | * | 6/1995 | Gourdine .................... 361/697 |
| 5,596,483 A | | 1/1997 | Wyler |
| 5,740,014 A | * | 4/1998 | Lin ............................. 361/697 |
| 5,757,619 A | * | 5/1998 | Imai et al. ................... 361/679 |
| 5,781,408 A | | 7/1998 | Crane, Jr. et al. |
| 6,243,263 B1 | * | 6/2001 | Kitahara ..................... 361/695 |
| 6,254,477 B1 | * | 7/2001 | Sasaki et al. .................. 463/1 |
| 6,266,243 B1 | * | 7/2001 | Tomioka ..................... 361/695 |
| 6,330,153 B1 | * | 12/2001 | Ketonen et al. ............. 361/690 |

FOREIGN PATENT DOCUMENTS

| | | |
|---|---|---|
| EP | 0 600 660 A2 | 6/1994 |
| JP | 10-49259 | 2/1998 |
| JP | 10-51170 | 2/1998 |
| WO | WO 96/23399 | 8/1996 |

* cited by examiner

*Primary Examiner*—Kim Nguyen
(74) *Attorney, Agent, or Firm*—Nixon & Vanderhye P.C.

(57) ABSTRACT

A television game machine includes a housing having an air intake and air exit in side surfaces, and forms an air flow passage in a space of air flow on a line connecting between the air intake and the air exit. A heat-radiating member formed with heat-radiating fins is attached in a state electrically insulated from a semiconductor device mounted on the printed board in order to transfer heat generated from the semiconductor device. The heat-radiating member is arranged related to the semiconductor device and printed board such that the heat-radiating fins are along the air flow passage. When ambient air is taken through the air intake and caused to flow through the grooves between the heat-radiating fins of the heat-radiating member to be released outside through the air exit, a fan releases the heat dissipated from the heat-radiating fins together with flowing air to an outside.

11 Claims, 5 Drawing Sheets

ELECTRONIC EQUIPMENT AND TELEVISION GAME MACHINE HAVING HEAT RADIATION STRUCTURE

BACKGROUND OF THE INVENTION

1. Field of the Invention

This invention relates to an electronic equipment and television game machine having a heat-radiating structure. More particularly, the invention relates to an electronic equipment and television game machine having a heat-radiating structure which is applicable for the electronic equipment, such as home-use video game machines and DVD players, incorporating semiconductor devices (CPU, etc.) and adapted to release the heat generated upon operation of digital processing, such as image processing, by the semiconductor devices and prevent the semiconductor devices from being thermally broken down.

2. Description of the Prior Arts

The electronic equipment, such as personal computers, home-use video game machines (TV game machines) and DVD players, incorporate therein a printed board mounting semiconductor devices, such as a central processor unit (CPU) for high-speed processing and image processor unit. There is a need to dissipate, to an outside, the heat generated from the semiconductor devices or printed board, in order not to break down the semiconductor devices due to the heat.

There are known Japanese Patent Laid-open No. 49259/1998 (Prior Art 1) and Japanese Patent Laid-open No. 51170/1998 (Prior Art 2), as conventional electronic equipment heat-radiating or cooling structures. Prior Art 1 has a heat-radiating plate directly connected to semiconductor devices, such as a CPU, to allow for spontaneous heat radiation through the heat-radiating plate (spontaneous heat-radiating scheme). Prior Art 2 discloses a technology that a small-sized fan is installed in a position above a CPU and the like to provide forcible heat radiation (forcible heat-radiating scheme in FIG. 8 to FIG. 10) and further a scheme that a heat-radiating plate is connected to the CPU and the like and a heat pipe is attached to the heat-radiating plate so that the heat-radiating plate and heat pipe is extended to a position of the small fan to perform forcible cooling (forcible cooling scheme in FIG. 1 to FIG. 7).

Meanwhile, in order for reducing the thickness, the conventional notebook personal computer has arrangement, in different areas in plan, of an optical information reading unit for reading from optical information recording mediums and a printed board mounting semiconductor devices such as CPU.

In the spontaneous heat-radiating scheme of Prior Art 1, the semiconductor devices can be prevented from being thermally broken down at low cost. However, a sufficient heat-radiating effect is unavailable for those having a high operating frequency of the CPU, etc. for high-speed processing or highly integrated semiconductor devices with great heat generation. In the spontaneous heat-radiating scheme, generally there is a limitation in volume of an electronic-equipment housing to nearly 10 W/1 litter. It is said that, where this is exceeded, there is a need to employ a forcible heat-radiating scheme or forcible cooling scheme.

In the forcible heat-radiating scheme of Prior Art 2, the arrangement of a small fan is restricted to a position of mounting the semiconductor devices including the CPU. This, however, inflicts limitation on position of arranging input/output connectors or external storage devices for the electronic equipment, resulting in influence on the heat-radiating effect as the arrangement position may be.

In the forcible cooling scheme of Prior Art 2, there is a necessity of providing a mesh wick inside the pipe and using a heat pipe to flow back vapor stream and condensation liquid, the heat pipe being extremely expensive. Furthermore, the small fan (heat-radiating fan) uses aluminum die-casting and hence the small fan is expensive, resulting in extremely expensive cost for the overall cooling system. Accordingly, the forcible cooling scheme is extremely expensive in cost for cooling efficiency. Also, in the forcible cooling scheme, the semiconductor devices is restricted in arrangement by a shape of the heat pipe and radiation plate, thus losing the freedom in design of the circuit board (printed board) and imposing restriction on housing design.

Meanwhile, where the electronic equipment is a notebook personal computer, it is usually used on the desk or knee and hence free from problems even if its size is large in plan. However, where the electronic equipment is a home-use television game machine, it is used in a place nearby a home-use television receiver and, in many cases, on the floor. In such a case, the form in plan if large is obstructive. However, if small in thickness, it is readily trodden by a user. If a flat-type television game machine is trodden on by the user, the various interior parts are probably damaged, besides the damage to the housing. If the damage was to a printed board mounting an expensive optical information reading unit, CPU, etc., repair cost would be expensive possibly resulting in a problem of increased burden upon the user.

SUMMARY OF THE INVENTION

Therefore, it is a primary object of the present invention to provide an electronic equipment and television game machine having a heat-radiating structure to provide a preferable heat-radiating effect to such an extent as not to thermally damage semiconductor devices at low cost, and excellent cost performance.

Another object of the present invention is to provide an electronic equipment and television game machine having a heat-radiating effect high in heat-radiating effect, despite cheap in structure, by properly selecting the structure of a heat-radiating member and a positional relationship between an air intake, an air exit and a heat-radiating fan for forcible air discharge.

A still another object of the present invention is to provide an electronic equipment and television game machine having a heat-radiating structure which is inexpensive but excellent in heat-radiating effect without the need of using an expensive heat pipe or a small-sized fan using aluminum die casting.

A yet another object of the present invention is to provide an electronic equipment and television game machine having a heat-radiating structure which is small in plan, not obstructive upon use but capable of reducing the possibility of being trodden by mistake, wherein, even if trodden by mistake, the interior parts are less damaged.

An electronic equipment having a heat-radiating structure (a first invention of claim 1) comprises at least one semiconductor device, a printed board, a housing, a radiating member and a radiating fan. The semiconductor device, by its operation, effects a desired operation of the electronic equipment and has heat generation during the operation, which includes for example a central processing unit (CPU), an image processing unit, a sound-source processing unit, a semiconductor memory and so on. At least one semiconductor device is mounted on the printed board. The housing has a space for accommodating therein the printed board, and is structured having an air exit formed in a side surface and an air intake formed in a position distant from the air exit to have an air flow passage to allow air on a line connecting between the air exit and the air intake (any of a straight line or a curved line). The heat-radiating member is arranged on the air flow passage within the housing, structured in electric insulation from the semiconductor device and to transfer the heat generated from the semiconductor device, and has a plurality of grooves formed along the air flow passage. The heat-radiating fan is provided between at least one of the air intake and the air exit and one end of the heat-radiating member closer thereto.

In this invention, the heat generated from the semiconductor device is conveyed to the heat-radiating member and then dissipated through a plurality of heat-radiating fins on the heat-radiating member. When the heat-radiating fan is rotated to intake air through the air intake and/or forcibly discharge (or ventilate) it through the air exit, cool air (ambient air) outside the housing is taken through the air intake. The cool air is caused to flow along the air flow passage including the grooves of the heat-radiating member whereby it is forcibly discharged together with the heat dissipated from the heat-radiating member to the outside of the housing through the air exit. This cools the heat-radiating member and the semiconductor device.

According to this invention, with a comparatively inexpensive structure a unique effect is provided that a preferred heat-radiating effect is obtainable in such an extent as to prevent the semiconductor device from being thermally broken down, providing a heat-radiating structure excellent in cost performance.

Also, in this invention, by properly selecting a positional relationship between the air intake, the air exit and the heat-radiating fan for forcible discharge and providing a proper structure to the heat-radiating member, a unique effect is provided that high radiation effect is available with a cheap structure without the necessity of using a heat pipe.

An electronic equipment according to this invention is an electronic equipment to be used connected to a display device and removably attached with an optical information recording medium optically recording data for image display, and comprises an optical information reading unit, at least one semiconductor element, a printed board, a housing, a heat-radiating member and a heat-radiating fan. The semiconductor device, by its operation, effects a desired operation of the electronic equipment and has heat generation during the operation, which includes for example a central processing unit (CPU), an image processing unit, a sound-source processing unit, a semiconductor memory and so on. A semiconductor device is mounted on the printed board. The housing has attaching portion formed in a top surface thereof to removably attach an optical information recording medium and a space for stacking and accommodating, at least, the optical information reading unit and the printed board in a height direction, to accommodate the optical information reading unit in a position related to the attaching portion and the printed board in a position below the optical information reading unit with a predetermined spacing and form an air exit in a side surface related to an accommodating position of the printed board in the height direction and an air intake in a position distant from the air exit to have an air flow passage to allow air on a line connecting between the air exit and the air intake. The heat-radiating member is arranged on the air flow passage within the housing, structured in electric insulation from the semiconductor device and to transfer the heat generated from the semiconductor device, and has a plurality of grooves formed along the air flow passage. The heat-radiating fan is provided between at least one of the air intake and the air exit and one end of the heat-radiating member closer thereto.

In this invention, in use, an optical information recording medium is attached on the optical information reading unit. The optical information reading unit reads out data for image display recorded on the optical information recording medium. The semiconductor device processes the data for image display read by the optical information reading unit thereby generating image data for display and supplying it to the display device, during operation of which heat is generated. The heat generated from the semiconductor device is conveyed to the heat-radiating member and then dissipated through a plurality of heat-radiating fins on the heat-radiating member. When the heat-radiating fan is rotated to intake air through the air intake and/or forcibly discharge (or ventilate) it through the air exit, cool air (ambient air) outside the housing is taken through the air intake. The cool air is caused to flow along the air flow passage including the grooves of the heat-radiating member whereby it is forcibly discharged together with the heat dissipated from the heat-radiating member to the outside of the housing through the air exit. This cools the heat-radiating member and the semiconductor device.

Preferably, the printed board and the heat-radiating member are covered by a metal case in a box form. Air flows along the air flow passage including the grooves on the heat-radiating member while the heat is being confined in the metal case, thereby being efficiently discharged. This reduces the heat transfer to an outside of the metal case and suppresses thermal bad effect upon other parts.

Furthermore, according to this invention, because the optical information reading unit and the printed board are stacked and accommodated within the housing, the housing can be reduced in plan shape. In use on the floor, the equipment is less obstructive and reduces the possibility of treading on by the user. In the event of treading on by mistake, a unique effect is provided that various interior parts be less damaged.

The above described objects and other objects, features, aspects and advantages of the present invention will become more apparent from the following detailed description of the present invention when taken in conjunction with the accompanying drawings.

DETAILED DESCRIPTION OF THE PREFERRED EMBODIMENTS

In the embodiments explained below, explanation will be made on a case that an electronic equipment having a heat-radiating structure is applied as an example to a home-use video game machine (television game machine). However, it is pointed out, in advance, that the equipment to which the technical idea of the invention is applicable is not limited to television game machines, but is also applicable to various electronic equipment, such as personal computers, DVD reproducing devices and the like incorporating CPU and image processing unit.

Figure 1:
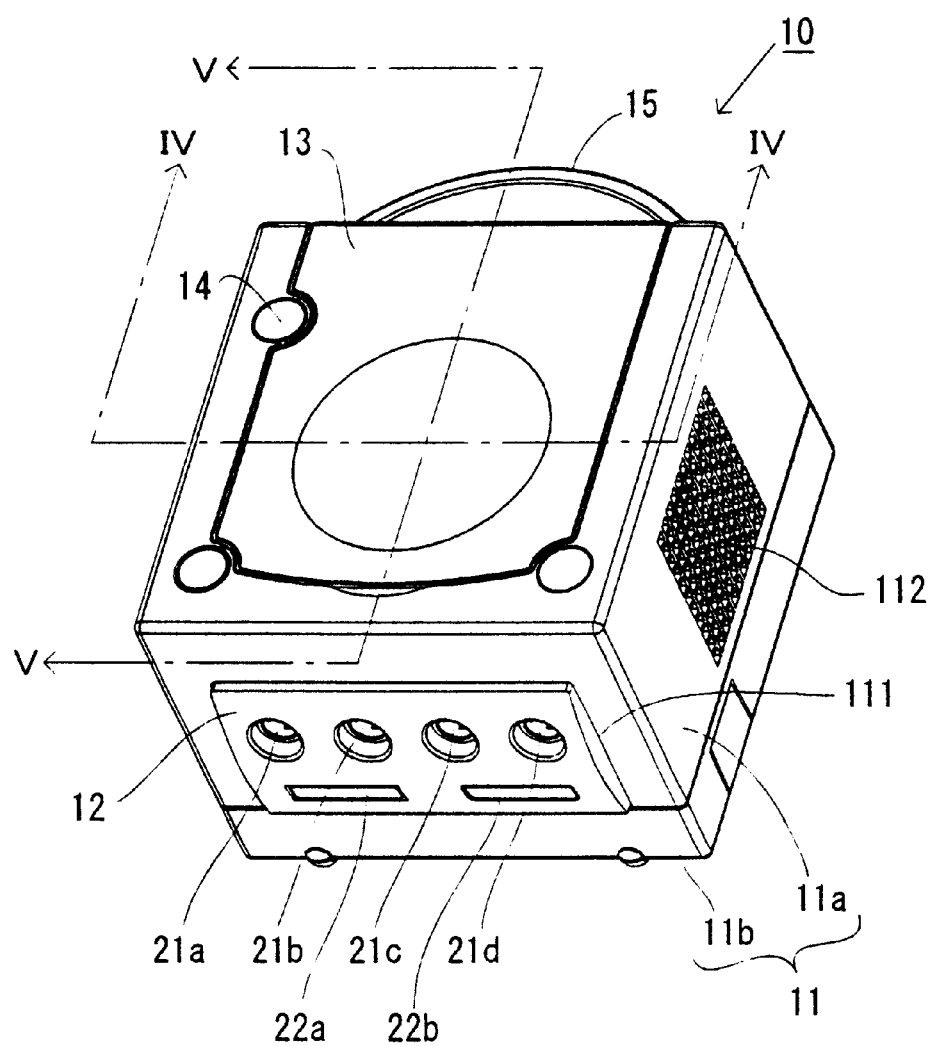
FIG. 1 is a perspective view as viewed from an upper front of a television game machine as an example of an electronic equipment having a heat-radiating structure according to an embodiment of the present invention.
Figure 2:
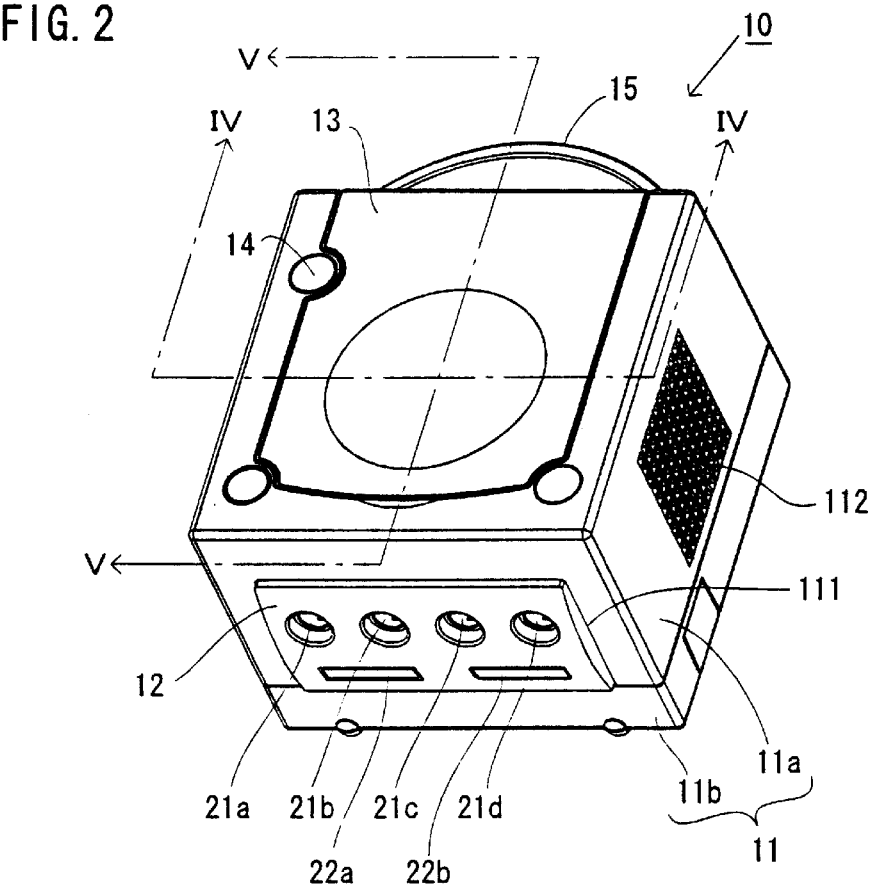
FIG. 2 is a perspective view of the television game machine as viewed from the front and right side.
Figure 3:
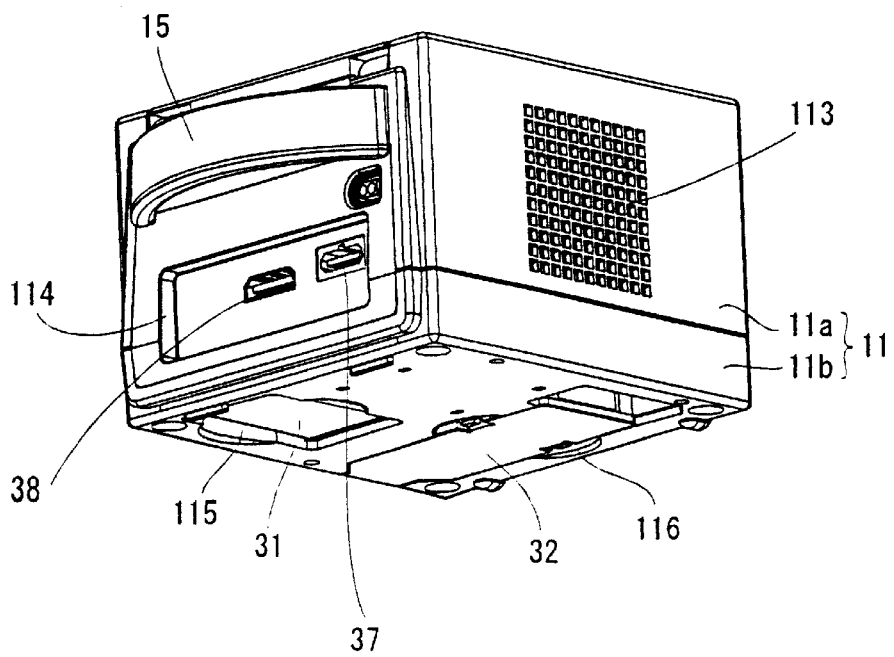
FIG. 3 is a perspective view of the television game machine as viewed from the rear and back.

FIG. 1 is a perspective view, as viewed from an upper front, of a television game machine as one example of an electronic equipment having a heat-radiating structure according to one embodiment of the invention. FIG. 2 is a perspective view of the television game machine as viewed from the front and right side. FIG. 3 is a perspective view of the television game machine as viewed from the rear and back. Next, referring to FIG. 1 to FIG. 3, explanation is made on an schematic structure of a television game machine 10 of this embodiment.

The television game machine (or television game machine main body) 10 includes a housing 11 generally in a cubic form, as shown in FIG. 1 to FIG. 3. The housing 11 is structured by an upper housing 11a and a lower housing 11b. The upper housing 11a in its front surface is formed with an aperture 111. In the aperture 111 (see FIG. 6 hereinafter referred), a controller-connection panel 12, hereinafter referred to, is attached. An air intake 112 is formed in one side surface (right side surface as viewed from the front) of the upper housing 11a. An air exit 113 is formed in the other side surface (left side surface as viewed from the front) opposite to the air intake 112. These air intake 112 and air exit 113 (note that the air exit 113 in FIG. 1 and FIG. 2 is hidden and not seen) may be structured by forming a plurality of penetration holes as shown in the figure, or otherwise by arranging a mesh-form filter in a single, large penetration hole. A lid member 13 is attached for open and close on a top surface of the upper housing 11a (planer surface as viewed in FIG. 1 and FIG. 2). The lid member 13 is opened and closed, for example, when an optical information recording medium such as CD-ROM or DVD is inserted. Also, a power switch 14 is provided on the top surface of the upper housing 11a. A grip 15 for carrying the television game machine 10 and an aperture 114 are formed in the back surface of the housing 11. The lower housing 11b in its bottom surface is formed with a recess (or aperture recess) to receive therein a memory unit 31 and a recess (or aperture recess) 116 to receive a communication modem unit 32, as will be concretely shown in FIG. 4 hereinafter referred to. Removably received in the recess 115 is a memory unit 31 used for the purpose of extension for RAM 44 as will be hereinafter described. Received in the recess 116 is a modem unit 32 for extending communication functions. The recess 115 and memory unit 31, the recess 116 and communication modem unit 32 are respectively formed with lock mechanisms (not shown) comprising engaging pawls and engaging recesses, in order to provide a structure for engagement and disengagement.

The controller-connection panel 12 has connectors 21a–21d to removably connect controllers (or game controllers; not shown) of the television game machine 10, and connectors 22a, 22b to removably connect memory cartridges (not shown) for storing backup data.

Figure 4:
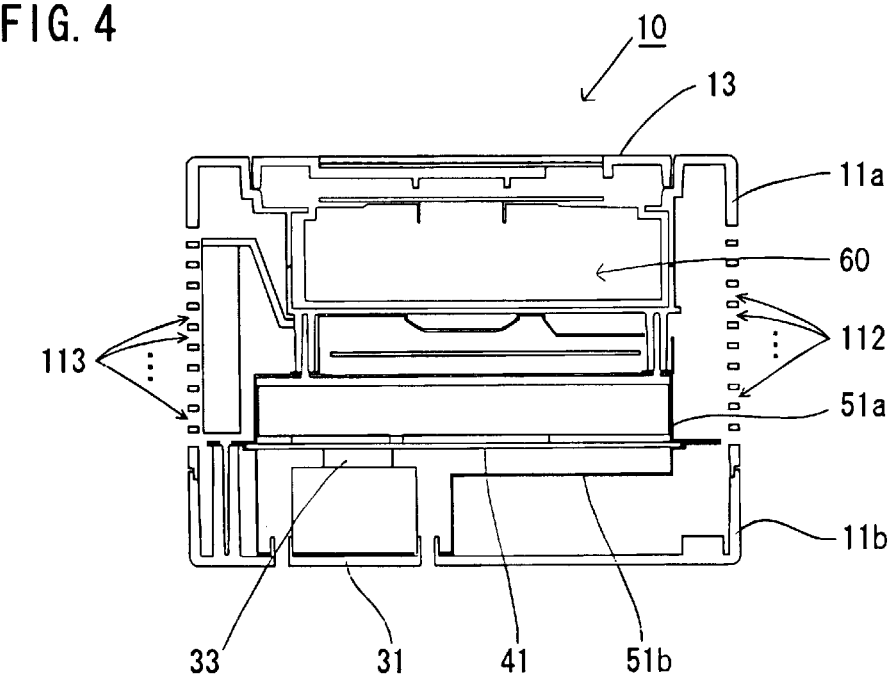
FIG. 4 is a sectional view taken along line IV—IV in FIG. 1.
Figure 5:
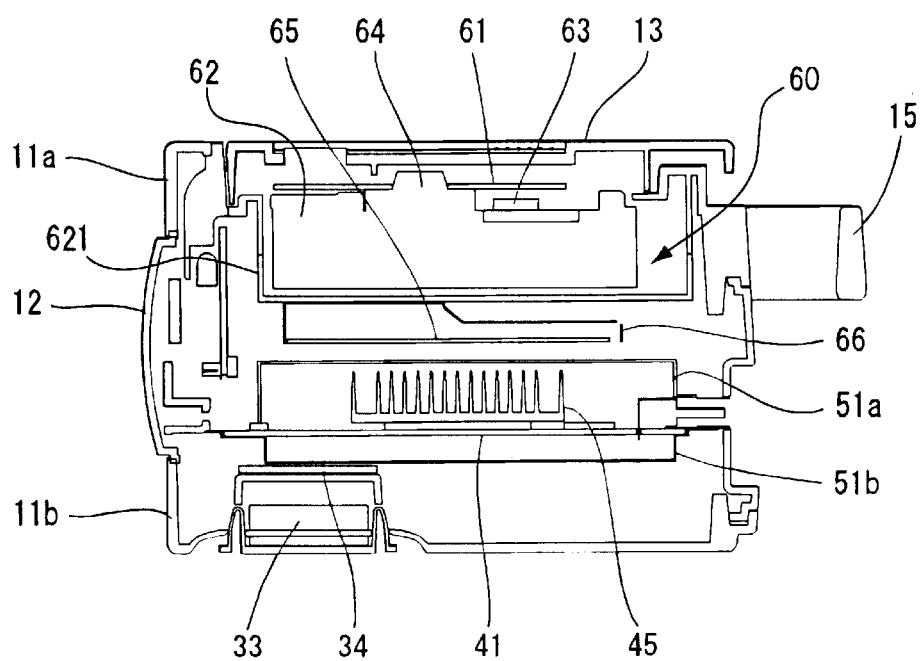
FIG. 5 is a sectional view taken along line V—V in FIG. 1.
Figure 6:
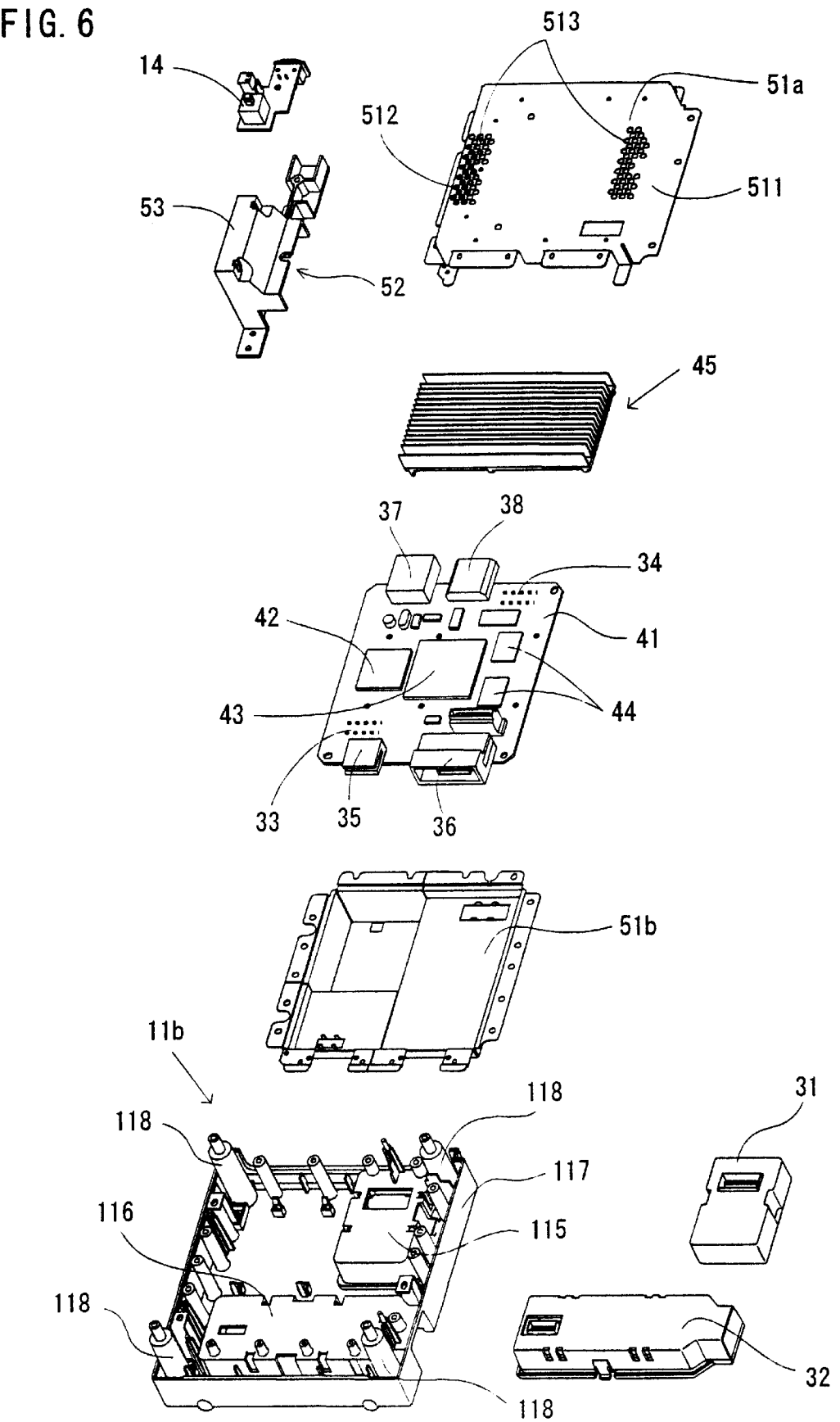
FIG. 6 is an exploded perspective view showing in detail a part of an interior structure (lower housing, board, heat-radiating member, heat-radiating fan, metal case, etc.) of the television game machine.
Figure 7:
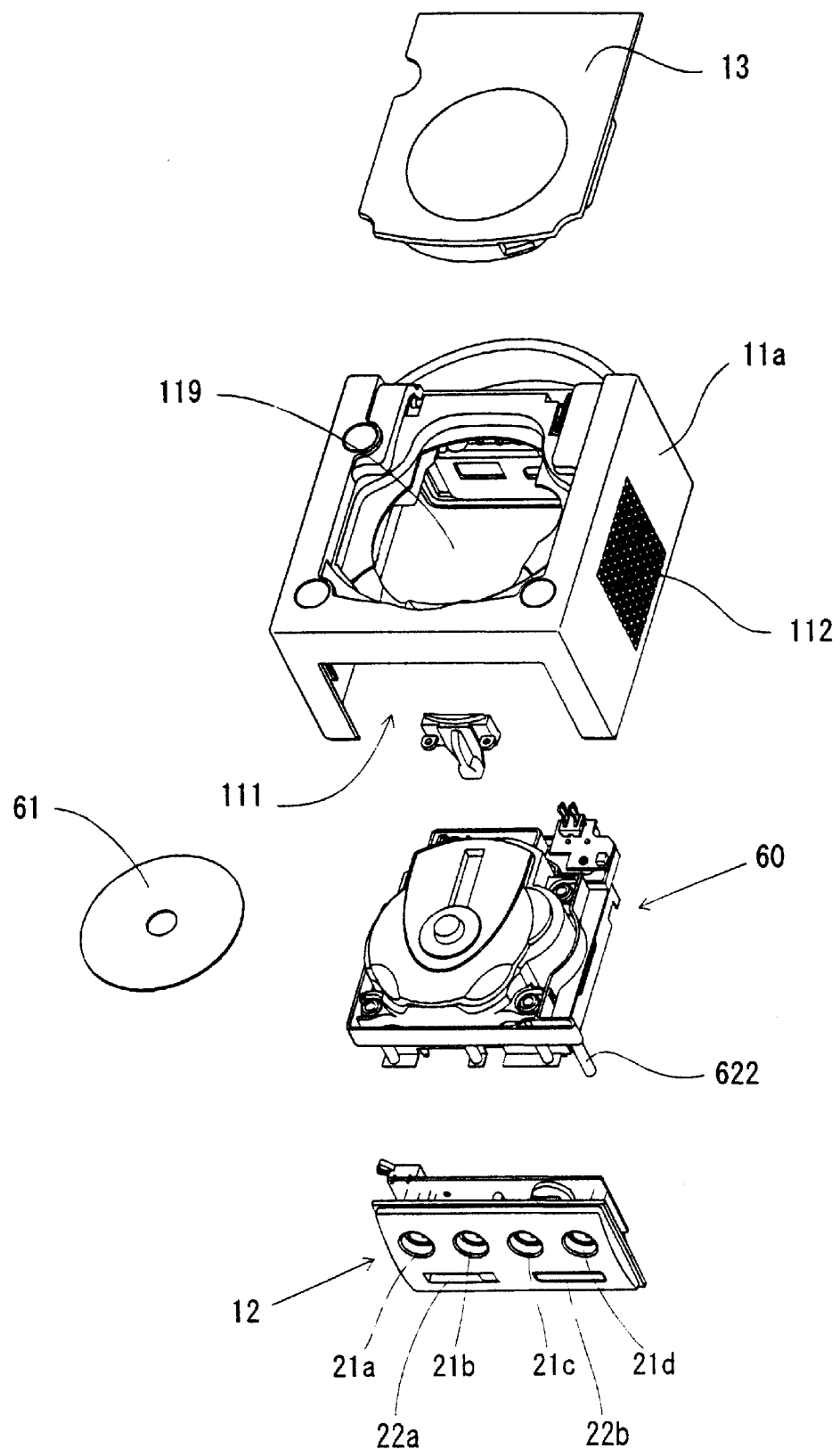
FIG. 7 is an exploded perspective view showing in detail a part of the interior structure (control panel, DVD drive unit, upper housing, opening-and-closing lid, etc.) of the television game machine.

FIG. 4 is a sectional view taken along line IV—IV in FIG. 1, while FIG. 5 is a sectional view taken along line V—V in FIG. 1. FIG. 6 and FIG. 7 are exploded perspective views concretely showing an interior structure of the television game machine 10. Next, with reference to FIG. 4 and FIG. 7, explanations will be made in detail on a heat-radiating structure of the television game machine 10.

The lower housing 11b is generally square in plan, and has side walls 117 in a manner encompassing a planer portion thereof. A plurality of spacers 118 are formed in the lower housing 11b and surrounded by the side walls 117, to hold a printed board 41 and a hereinafter-described optical information reading unit 60 in a predetermined relationship of position. Connector-insertion holes are formed in the recess 115 and recess 116 formed in a bottom of the lower housing 11b.

The printed board 41 (see FIG. 4 to FIG. 6) is accommodated in the housing 11. The printed board 41 is formed with a predetermined circuit pattern. On the board, semiconductor devices or semiconductor parts 42–44 are mounted along an air flow passage, hereinafter described. The semiconductor devices include, for example, a central processing unit (CPU) 42 to execute game programs, an image processing unit (or image processor IC) 43 and writable memory (RAM) 44. This RAM 44 is used as a graphic memory to store image data to be image-processed in a bit-map form and/or a working memory to temporarily store a variety of data under processing. These semiconductor devices 42–44 are arranged and mounted in a sideway direction (i.e. in a direction of air flow for heat dissipation) in a position of an almost center with respect to a depth direction of the printed board 41. Among the semiconductor devices 42–44, the image processing unit 43 is the greatest in heat generation and the CPU 42 is the second greatest.

Meanwhile, the printed board 41 has connectors 33, 34 fitted in positions on the bottom surface corresponding to the mount positions of a memory unit 31 and a communication modem unit 32 to be electrically connected to a predetermined circuit pattern on the printed board 41. These connectors 33, 34 are exposed through the connector-insertion holes in the recess 115 and recess 116. Furthermore, the printed board 41 has connectors 35, 36 attached in a front end thereof, for electrical connection to the connectors 21a–21d and 22a, 22b of the controller-connection panel 12. The printed board 41 has connectors 37, 38 attached in a rear end thereof, for connection to a power supply and AV cable.

The semiconductor device 42–44 has electrically-insulating and thermally-conductive sheet (not shown) adhered at a top surface of a package thereof. On the heat conductive sheet, a heat-radiating member 45 is bonded along a direction of air flow, hereinafter described. The heat-radiating member 45 is structured, as shown for example in FIG. 5, in a comb form in section having a plurality of heat-radiating fins and grooves formed integral on a plate portion thereof. Each end of the heat radiating member 45 where the grooves are open defines an open end of the heat radiating member. As concerned with a plan form of the heat-radiating member 45, where the air flow passage connecting between the air intake 112 and the air exit 113 is in a linear form, i.e. where the air intake 112 and air exit 113 are formed symmetric in side surfaces, the heat-radiating member 45 in plan is formed in an oblong or square rectangular form. The number of the heat-radiating fins and/or the number of grooves between two heat-radiating fins is determined based on a quantity of heat generation by the semiconductor devices 42–44 as calculated by a predetermined calculation formula. The heat-radiating member 45, where rectangular in plan, is formed by hot extrusion of aluminum. Incidentally, the heat-radiating member 45 may be formed by aluminum die casting or cutting out (an aluminum plate having a large wall thickness is cut at a constant interval to thereby form a plurality of grooves and heat-radiating fins).

A metal case 51 is accommodated in the housing 11. The metal case 51 is used to confine heat, in a state of covering the printed board 41 mounting the semiconductor devices 42–44 and the heat-radiating member 45, and at the same time for preventing electromagnetic waves from unwantedly radiating and leaking to an outside. Specifically, the metal case 51 comprises an upper case 51*a* and a lower case 51*b*. The space defined by the upper case 51*a* and the lower case 51*b* is selected to accommodate the printed board 41 mounting various electronic parts. In either one of the upper case 51*a* or the lower case 51*b* of the metal case 51 (or both thereof, 51*a* in the embodiment), penetration holes 511 and second penetration holes 512, respectively in plurality, are first formed in positions (on the side of the right air intake 112 as viewed from the front and on the side of the right air exit 113 as viewed from the front) corresponding to the side surface (or a plurality of grooves) in a direction along the heat-radiating fins (in the left and right as viewed from the front) of the heat-radiating member 45. More preferably, the first penetration holes 511 and the second penetration holes 512 are selected in position such that a predetermined number of holes are opened in a position corresponding to each groove of the heat-radiating member 45 with respect to a direction of the groove but no holes are opened in an area opposed to heat-radiating fin. By thus properly selecting the positions of the grooves of the heat-radiating member 45 and the first penetration holes 511 and second penetration holes 512, the heat-radiating effect can be enhanced furthermore. Further preferably, a plurality of penetration holes 513 are formed in the top surface of the upper case 51*a* in a position close to the air exit 113, in order to increase the area of the air exit. positions of the grooves of the heat-radiating member 45 and the first penetration holes 511 and second penetration holes 512, the heat-radiating effect can be enhanced furthermore. Further preferably, a plurality of penetration holes 513 are formed in the top surface of the upper case 51*a* in a position close to the air exit 113, in order to increase the area of the air exit.

A heat-radiating fan 52 is provided between the air exit 113 and the heat-radiating member 45. The heat-radiating fan 52 uses a vertical-type fan structured to rotate a fan by a small-sized motor. A duct 53 is formed between heat-radiating fan 52 and the upper case 51*a* forming the penetration holes 512, 513, in order to discharge air with efficiency.

A circular aperture 119 is formed in the top surface of upper housing 11*a*. A lid 13 is attached for open and close to cover the aperture 119. An optical information reading unit 60 is accommodated below the aperture 119. The optical information reading unit 60 is to read out information optically recorded on the optical information recording medium 61, such as a CD-ROM or DVD, and includes a support mechanism to rotatably support the optical information recording medium 61, a pickup part 63, a rotary mechanism 64 and a positioning mechanism 65 for the pickup part 63. The support mechanism 62 has side-wall portion 621 formed in the lower position thereof to extend along a planar peripheral edge. The side-wall portion 621 is formed such that, even if the heat generated from the semiconductor devices 42–44 of the printed board 41 and dissipated through the heat-radiating member 45 partly leeks from the metal case 51, it can be reduced from being conveyed to the pickup part 63 in the optical information reading unit 60. This is because the pickup part 63 is thermally the least weak part among the electronic parts used in the electronic equipment 10. The pickup part 63 includes a light emitting element such as a light-emitting diode for semiconductor laser, a light-receiving element for receiving reflection light that the light emitted from the light-emitting element reflect upon the optical information recording medium 61 and then returns, a positioning mechanism for changing the position of the light-emitting element and light-receiving element.

A control circuit board 65 is accommodated in a position below the optical information reading unit 60 in the housing, in order to drive and control the optical information reading unit 60. The control circuit board 65 is covered by a metal case 66 to reduce or prevent electromagnetic wave noise or unwanted radiation. In a side surface of the metal case 66, penetration holes for air intake and discharge are formed. It is noted that the heat generation by the circuit parts mounted on the control circuit board 65 is by far less as compared to that of the semiconductor devices 42–44 mounted on the printed board 41. Accordingly, the number of penetration holes (or total area of the penetration holes) formed in the metal case 66 is satisfactorily by far less as compared to the number of the penetration holes 511–513 (total area of the penetration holes) in the metal case 51.

The television game machine 10 is assembled by the following process. That is, the lower housing 11*b* is placed on a working table. The lower case 51*b* is received and positioned in a predetermined position inside the lower housing 11*b*. Stacked thereon are the printed circuit board 41 mounting semiconductor devices 42–44, a heat-radiating member 45, connectors 33, 34 and other required electronic parts. Covering these elements is the upper case 51*a*. In this case, positioning is made such that the grooves and heat-radiating fins of the heat-radiating member 45 are positioned on the air flow passage extending from the air intake 112 to the air exit 113. A heat-radiating fan 52 is arranged in a position close to the penetration holes 512, 513. The control circuit board 65 covered with a metal case 66 is placed on the metal case 51. Stacked thereon is the optical information read unit 60. Further, the support pillars 622 formed in a bottom surface of the optical information reading unit 60 are fitted to at least two spacers 118 formed on the lower housing 11*b*.

The operation panel 12 is prepared in a state previously attached with connectors 21*a*–21*d* for connecting the controllers (not shown) of the television game machine, and the connectors 22*a*, 22*b* for connecting a backup memory (not shown). The operation panel 12 is engaged in an upper front part of the lower housing 51*b*. Also, a power switch 14 is attached to the metal case 51*a*. Then, the upper housing 11*a* is covered over the optical information reading unit 60. The upper housing 11*a* and the lower housing 11*b* are screwed together by tightening screws (not shown) from the backside of the lower housing 11*b*. Thereafter, the lid member 13 for open and close is attached to the top surface of the upper housing 11*a*.

By assembling as above, the lower case 51*b* of the metal case 51, the printed board 41, the upper case 51*a*, the control circuit board 65, the metal case 66 and the optical information reading unit 60 are stacked and accommodated in the order from the below within the housing 11.

By the above structure, the heat-radiating member is provided on the air flow passage connecting between the air intake and the air exit that are formed in the side surfaces of the housing 11. The dissipation heat from the heat-radiating fins of the heat-radiating member can be forcibly released by the heat-radiating fan arranged at the end of the air flow passage. Accordingly, with comparatively inexpensive structure, the heat-radiating member and the semiconductor devices can be cooled with efficiency thus providing preferred heat-radiating effects in such a degree as to prevent the semiconductor devices from thermally broken down. Thus, a heat-radiating structure excellent in cost performance is provided. Moreover, by properly selecting a positional relationship between the air intake, air exit and the heat-radiating fan for forcible discharge and by making the heat-radiating member in a proper structure, it is possible to obtain a high heat-radiating effect on the inexpensive structure without using a heat pipe.

In the preferred embodiment, the printed board and the heat-radiating member is covered by a box-formed metal case. This allows air to flow along the air flow passage including the grooves of the heat-radiating member and exit with efficiency while heat is confined within the metal case. This makes it possible to reduce the heat from being transferred to an outside of the metal case, thus suppressing adverse thermal effect upon other parts.

By the above assembling, the lower case 51a of the metal case 51, the printed board 41, the upper case 51b, the control circuit board 65, the metal case 66 and the optical information reading unit 60 are stacked in the order from the below within the case 11. In this manner, if adopting the stack structure of the printed board 41, the optical information reading unit 60 and/or the control circuit board 65, it is satisfactory to provide a small area in plan in the housing 11. This provides advantages, i.e. easy to assemble, improving production efficiency and manufacturing at low cost. Also, the housing 51 is made generally in a cubic form by reducing the plan shape thereof but extending in a height (thickness) direction. Consequently, the television game machine 10, even if put on the floor and used there, comparatively less space is occupied and hence not obstructive, reducing the possibility of being trodden by a user. In the event of being trodden by a user, the user can readily recognize treading something before moving the body weight to the treading foot. It is possible to prevent against treading on by the total body weight. Thus, there is less possibility of damaging all the parts within the housing 11, reducing the damage of the parts to a minimum and hence reducing the burden for repair imposed on the user. Moreover, the generally cubic form of the housing 11 increases the strength of the housing 11 itself higher than that of a flat-formed housing structure alike the notebook personal computer, further reducing the possibility of damage or breakage due to mistakenly treading on by the user.

Incidentally, the memory unit 31 and/or the communication modem unit 32 are marketed separate from the television game machine 10. The user can purchase same as required and attached it to the lower housing 11b of the television game machine into electrical connection to the printed board 41, using extension functions. In place of the memory unit 31, a hard disk may be connected to the connector 34.

Incidentally, in the above embodiment, the inventors confirmed by experiments that the temperature inside the housing 11 was below a permissible upper temperature for the semiconductor devices 42–44 in a region close to or around the semiconductor devices 42–44.

Next, another embodiment or modification of this invention will be explained. The heat-radiating structure of this invention is usable, as applications of the electronic equipment in this invention, for equipment such as personal computers, CD players and DVD players. In such cases, in place of the connectors attached on the operation panel 21, the connectors and operation switches, etc. in used will be different depending upon the kind/application of electronic equipment to which this invention is applied. For example, where the electronic equipment is a DVD player, provisions will be made with various switches for operating the DVD player, indicators for indicating operating state and so on.

Also, in the above embodiments, explanation was on the case that the heat-radiating member and the air flow passage were arranged in linear form. However, in another example, an air intake 112 and the air exit 113 are formed in the adjacent side surfaces (or in orthogonal side surfaces; for example, the air intake 112 is in a back surface and the air exit 113 in a left side surface, an air flow passage connecting between the air intake 112 and the air exit 113 is in an arcuate form (or in an L-letter form having a small arc in the corner), and a heat-radiating member 45 in plan is in an arcuate form (or an L-letter form) extending along the air flow passage. Also, in an electronic equipment having no need of providing an operating panel 12 in the front surface, the air intake 112 and air exit 113 may be formed in the front and back surfaces of the housing 11. In such a case, the arrangement position of semiconductor devices 42–44 on the printed board 41 and the direction of the grooves in a heat-radiating member 45 will be modified matched to the positions of the air intake 112 and air exit 113.

Also, in the above embodiment, explanation was on the case that the air intake 112 was in the right side surface. However, if the optical information recording medium 61 onto the optical information reading unit 60 is attached by the front loading scheme for withdrawing to the front of a front panel instead of the scheme of opening and closing the top lid 13 and the printed board 41 is structurally stacked in the uppermost level, then an air intake 112 may be formed in the top surface of the housing 11. In such a case, a penetration hole 511 of the air intake will be formed in the top surface of the metal case 51.

Furthermore, in the above embodiments, explanations were on the case that the heat-radiating fan 52 is used as an air-discharging fan. However, as another method, it may be used as a fan for air intake by arranging it between the air intake 112 and the heat-radiating member 45. In order to further enhance the heat-radiating effect, the heat-radiating fan 52 may be provided both on the air intake 112 and on the air exit 113.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic equipment including an electronic game machine, comprising:
   at least one semiconductor device for causing the game machine of the electronic equipment to effect a desired operation, wherein hear generating occurs during the operation;
   a printed board on which said semiconductor device is mounted;
   a housing having a space for accommodating said printed board and forming an air exit in a first side surface of the housing and an air intake in a second side surface of the housing at a position distant from and corresponding to said air exit, to have an air flow passage allowing air to flow on a line linearly between said air exit and said air intake;

a hear-radiating member having a first open end portion and a second open end portion, the hear-radiating member arranged on said air flow passage in a manner so that said first open end portion is close to the air exit and the second open end portion is close to the air intake, the heat-radiating member being electrically insulated from said semiconductor device and capable of transferring heat generated from said semiconductor device, and forming a plurality of heat-radiating fins and linear grooves along said air flow passage, said fins and grooves extending between the first and second open end portions of the heat-radiating member, wherein a width of the air exit is smaller than a width in a depth direction of the first side surface of the housing, a width of the air intake is smaller than a width in a depth direction of the second side surface of the housing;

a fan arranged between at least one of said air intake and said air exit and one end of said heat-radiating member to cause air taken through said air intake to flow along the grooves of said heat-radiating member and forcibly release heat generated from said semiconductor device through said air exit; and wherein said printed board and said heat radiating member are located within a case (51a, 51b) located in said housing, and wherein an optical information reading unit and an optical disc are mounted above an upper surface of said case.

2. The electronic equipment according to claim 1, wherein said case is a metal case and is accommodated within said housing and formed in a box form covering back and top surfaces of said printed board to confine heat dissipated from said heat-radiating member placed over said printed board, wherein said metal case has a first penetration hole formed with a wider width in a position corresponding to said air intake and a second penetration hale formed with a wider width in the vicinity of said fan.

3. The electronic equipment according to claim 2, further comprising a duct provided between at least one of the first penetration hole and the second penetration hole of said metal case and said fan, to efficiently release heat in air flowing along the grooves of said heat-radiating member in said metal case.

4. The electronic equipment of claim 1, wherein the heat-radiating member is formed by a hot extrusion forming.

5. An electronic equipment to be connected to a display device of a gaming machine and removably attached with an optical information recording medium optically recording data for image display, comprising:

an optical information reading unit for reading out data for image display recorded on said optical information recording medium;

at least one semiconductor device for processing data for image display read out by said optical information reading unit to generate image data, wherein heat generation occurs during processing operation thereof;

a printed board on which said semiconductor device is mounted;

a housing having an attaching portion formed on a top surface of the housing to removably attach said optical information recording medium on the housing, the housing having a space to stack and accommodate in a height direction at least said optical information reading unit and said printed board, accommodating said optical information reading unit in a position related to said attaching portion, and accommodating said printed board in a position below said optical information reading unit with a predetermined spacing, the housing including an air exit in a first side surface of the housing and an air intake in a second side surface of the housing at a position distant from and corresponding to said air exit so as to have an air flow passage for flowing air on a line linearly connecting between said air exit and said air intake;

a heat-radiating member having a first open end portion and a second open end portion, the heat-radiating member arranged on said air flow passage in a manner so that the first open end portion is close to the air exit and the second open end portion is close to the air intakes the heat-radiating member being electrically insulated from said semiconductor device and capable of transferring heat generated from said semiconductor device, and the heat-radiating member having a plurality of heat-radiating fins and linear grooves formed along said air flow passage, said fins and grooves extending between the first and second open end portions of the heat-radiating member;

wherein a width of the air exit is smaller than a width in a depth direction of the first side surface of the housing, a width of the air intake is smaller than a width in a depth direction of the second side surface of the housing; and a heat-radiating fan provided between at least one of said air intake and said air exit and a corresponding end of said heat-radiating member to cause air taken through said air intake to flow along the grooves and heat generated from said semiconductor device to be forcibly released through said air exit.

6. the electronic equipment according to claim 5, further comprising a metal case accommodated within said housing and formed in a box form covering back and top surfaces of said printed board, to confine heat dissipated from said heat-radiating member placed over said printed board, wherein said metal case having a first penetration hole formed in a position corresponding to said air intake and a second penetration hole formed in the vicinity of said heat-radiating fan.

7. the electronic equipment according to claim 5, wherein said housing is formed, in a bottom surface of the housing, with a first recess to removably receive a writable-and-readable semiconductor memory unit for functional extension for said electronic equipment, said printed board being formed with a first connector for electrical connection to said semiconductor memory unit received in said first recess, and said semiconductor memory unit in a state received in said first recess being connected to said first connector.

8. the electronic equipment according to claim 7, wherein said housing is fanned, in a bottom surface of the housing, with a second recess to removably receive a communication modem unit for extending a communication function for said electronic equipment, said printed board being formed with a second connector for electrical connection to said communication modem unit received in said second recess, and said communication modem unit in a state received in said second recess being connected to said second connector.

9. The electronic equipment according to claim 5, wherein said electronic equipment is a television game machine to be connected to a television receiver, said optical information recording medium optically readably recording game program data for game image display, and said semiconductor device generating a game image by processing the game program data read out by said optical information reading unit and supplying the game image to said television receiver thereby displaying said game image.

10. An electronic game equipment to be used in conjunction with a display device, comprising:

an optical information reading unit for reading out data for image display recorded on an information recording medium;

at least one semiconductor device for processing data for image display read out by said optical information reading unit, so as to generate image data, and wherein heat generation occurs during processing operation of the semiconductor device;

a circuit board supporting said semiconductor device;

a housing having a space to stack and accommodate at least said optical information reading unit and said circuit board, with the circuit board being located at an elevation below said optical information reading unit;

the housing including an air exit in a first side of the housing and an air intake in a second side of the housing, and a linear air flow path being defined in a linear manner between the air intake and the air exit;

a heat-radiating member having a plurality of parallel elongated fins and grooves extending in a manner so as to be aligned with each of the air intake and the air exit, the heat-radiating member being located in the linear air flow path directly between the air intake and the air exit and below the optical information reading unit, and the heat-radiating member being electrically insulated from said semiconductor device and capable of transferring heat generated from said semiconductor device; and a fan provided between at least one of said air intake and said air exit and a corresponding end of said heat-radiating member to cause air taken through said air intake to flow along the grooves and heat generated from said semiconductor device to be forcibly released through said air exit.

11. The electronic game equipment of claim 10, wherein said electronic game equipment is a television game machine to be connected to a television receiver, said optical information recording medium optically readably recording game program data for game image display.

* * * * *